(No Model.)
E. S. GILMORE.
SAW REGULATING ATTACHMENT FOR BAND SAWING MACHINES.
No. 406,209. Patented July 2, 1889.
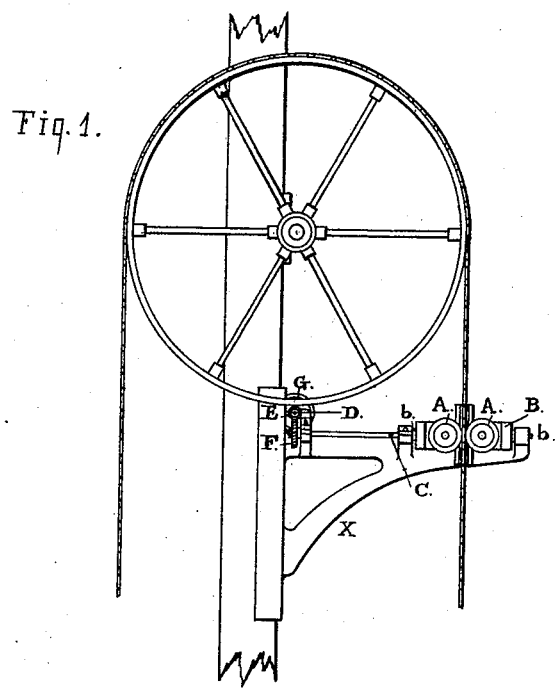
Fig. 1.
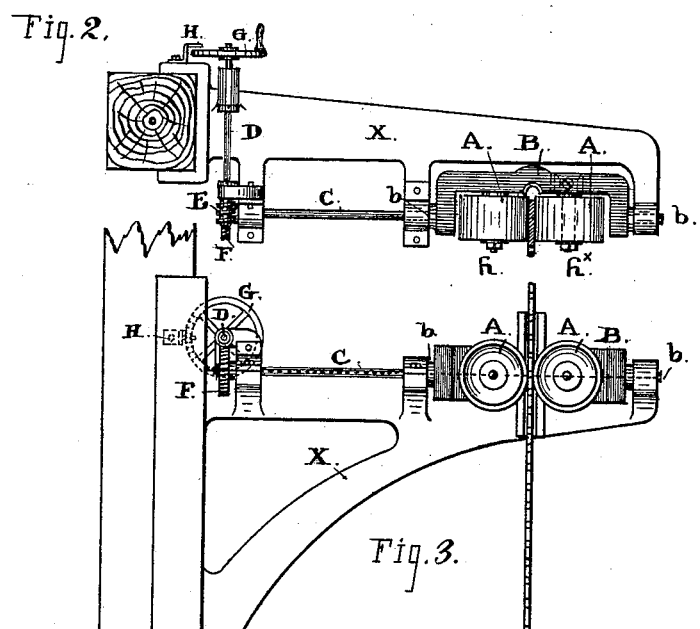
Fig. 2.
Fig. 3.
Witnesses:
Inventor:

UNITED STATES PATENT OFFICE.

ELIJAH S. GILMORE, OF SAN FRANCISCO, CALIFORNIA, ASSIGNOR OF TWO-THIRDS TO NATHAN W. SPAULDING, OF SAME PLACE.

SAW-REGULATING ATTACHMENT FOR BAND SAWING-MACHINES.

SPECIFICATION forming part of Letters Patent No. 406,209, dated July 2, 1889.

Application filed January 3, 1889. Serial No. 295,359. (No model.)

*To all whom it may concern:*

Be it known that I, ELIJAH S. GILMORE, a citizen of the United States, residing in the city and county of San Francisco, and State of California, have invented an Improved Saw-Regulating Attachment for Band Sawing-Machines, of which the following is a specification.

My invention relates to a novel means or device for controlling the cutting-edge of an endless band-saw, by which those movements of the saw in a longitudinal direction or into and out of the wood while running can be checked and governed and the saw be placed under perfect control of the sawyer during work.

The principal parts of my device consist of two rollers mounted on a suitable support behind the saw, above the work table or carriage, to embrace and grip the saw-blade between them, and while running in frictional contact with the blade to have also an angular movement together in a vertical arc or in the same plane with the saw-blade, and in connection with such rollers suitable mechanism for setting and holding them in position to run with the saw or at greater or less angle across the plane in which the saw runs.

The effect of changing the position of two rollers having suitable grip or pressure against the faces of saw-blade running between them, so that the rollers set diagonally across the faces of the blade, is to produce longitudinal movement of the blade on its carrying-wheels or to resist the tendency of the saw while running to move in such direction either forward or backward, and by this means the saw is kept up to its work against those varying forces and influences that cause its cutting-edge to crowd forward into the wood or run back from it.

The following description explains the manner in which I have produced and applied my invention in its simplest form, and the accompanying drawings illustrate its construction and arrangement on a band sawing-machine of the kind most commonly in use, in which the band-saw is mounted on carrying-wheels to run in a vertical plane.

Figure 1 represents the upper carrying-wheel and portion of the saw-blade running over it with my improvement applied for operation at a point between the top carrying-wheel and the work table or carriage. Fig. 2 is a top view of the rollers, their supporting-bracket, and the mechanism for setting and holding the rollers from the back of the machine. Fig. 3 is a front elevation of Fig. 2, these two figures being represented on a larger scale.

In this construction the two rollers A A are mounted in a yoke B, that is hung on journals $b\ b$ in a stationary support X, and on these points as centers the yoke is capable of limited movement in a vertical arc. From one side of the yoke a shaft C, which may be a prolongation of the journal $b$ at that side, extends along the support X to a shorter shaft D, standing at right angles, and the two shafts are connected by a worm E on one and a worm-wheel F on the other. The shorter shaft is furnished with a hand-wheel G and also with a scale and pointer H. This mechanism constitutes the means by which the yoke is tilted and set in different positions out of the horizontal to change the rollers with respect to the plane in which the saw-blade runs. To hold these parts behind the saw and at convenient height, I have fixed them on a bracket X, that can be bolted to the frame of the machine below the upper carrying-wheel; but any other suitable support which may be afforded by a part of the frame itself can be employed wherever practicable in attaching the device to a machine. The yoke has two studs $h\ h^\times$ for the rollers, and while one is fixed the other $h^\times$ is adjustable in the yoke toward and away from the fixed one, for the purpose of regulating the grip or degree of frictional contact upon the saw-blade running between the rollers.

The provision for shifting the roller-stud in the present construction consists in slotting the back of the yoke and fitting the end of the stud in it to be sufficiently rigid, but also capable of being moved laterally, its position being fixed when set by screws taking through the yoke into the stud, as shown in Fig. 2 of the drawings. The rollers should have rubber faces to insure suitable frictional contact with the saw-blade. As thus mounted and applied, the rollers are constantly acting when the saw is running between them, and any change in their position whereby their faces are thrown diagonally across the face of the saw-blade will operate upon the saw to produce longitudinal movement, the extent and rapidity of which movement, as well as its direction, whether forward or backward, will depend on the angle of adjustment and the direction thereof. If the rollers are depressed at the front below the horizontal, the saw-blade will be drawn back or away from the wood; or, if they are set at an angle above the horizontal, the saw will be influenced in the opposite direction and will move into the wood. By such adjustments of the rollers from time to time as called for, the saw can be kept properly to its work, as any tendency of the cutting-edge to crowd forward or to be set back by reason of variations in the density, softness, and other qualities of the wood, or of other forces and influences, can be quickly checked and counteracted.

The matter contained in claims 1 and 2 of this application is shown in an application filed by me on the 16th day of June, 1887, Serial No. 241,553, but is not broadly claimed therein.

Having thus fully described my said invention, what I claim, and desire to secure by Letters Patent, is—

1. A saw-regulating attachment for band sawing-machines, consisting of two rollers adapted to grip the saw-blade between them and capable of angular adjustment with respect to the plane in which the saw-blade runs, whereby they can be set to rotate at an angle across the saw-blade, in combination with means for setting and holding the rollers at different angles across the saw-blade, substantially as described, for operation as set forth.

2. In combination with a band-saw, a pair of gripping-rollers adapted to embrace and run with the saw-blade, and mounted in a tilting frame or carrier which is capable of adjustment to change the angle of rotation of the rollers with respect to the plane in which the saw runs, and mechanism connected with said tilting carrier for setting it at different angles of elevation and depression, as described, for operation as set forth.

3. In a band sawing-machine, the combination of the pivoted tilting frame or yoke having studs $h\ h^\times$, rollers A A, setting-shaft D, shaft C, connecting the yoke with the setting-shaft, and gears E F, arranged for operation as set forth.

In testimony that I claim the foregoing I have hereunto set my hand and seal.

ELIJAH S. GILMORE. [L. S.]

Witnesses:
CHAS. E. KELLY,
C. W. M. SMITH.